No. 895,960.
PATENTED AUG. 11, 1908.
T. CARNEY.
CASH REGISTER.
APPLICATION FILED DEC. 18, 1903.
6 SHEETS—SHEET 2.
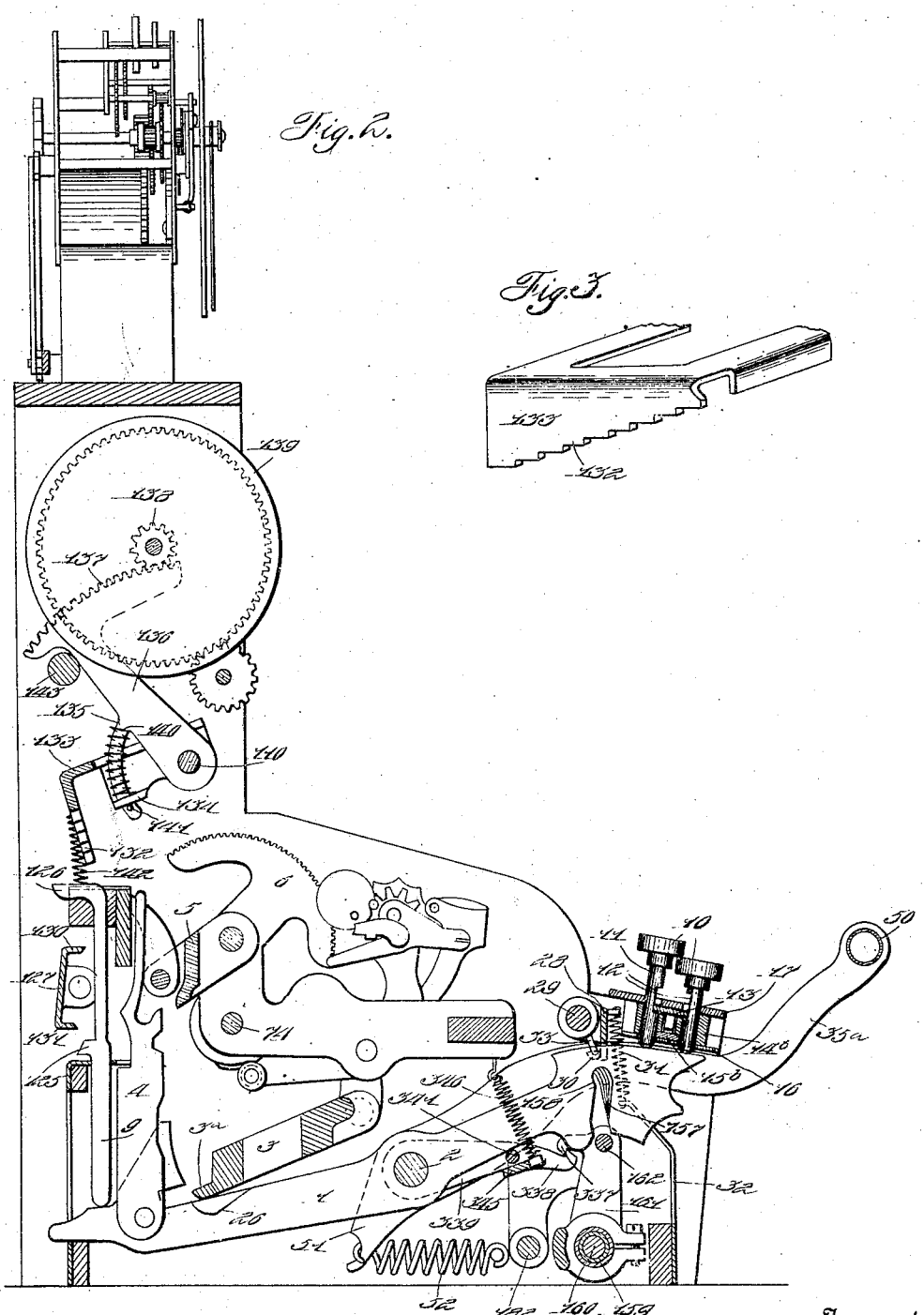

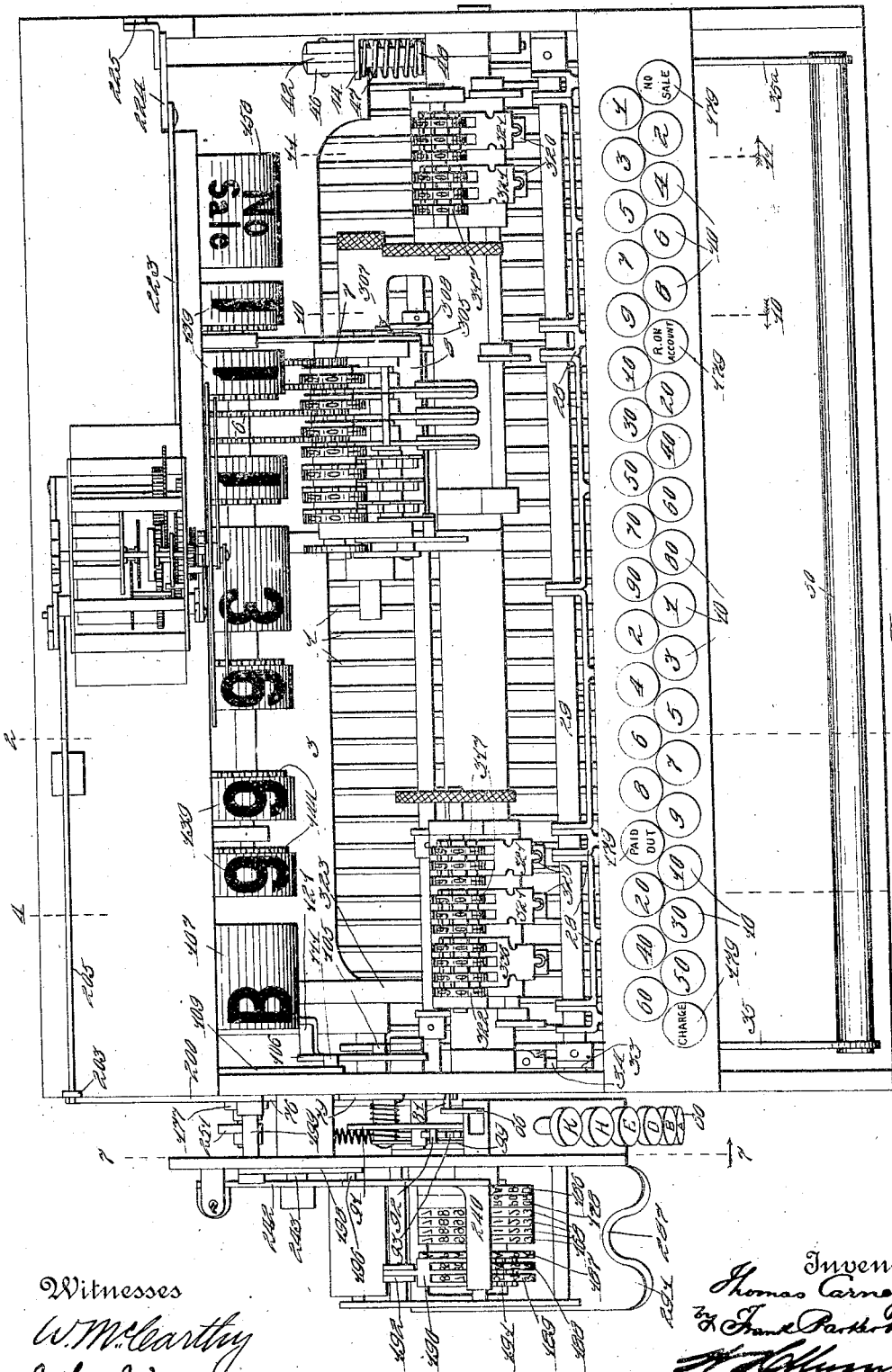

No. 895,960.  
T. CARNEY.  
CASH REGISTER.  
APPLICATION FILED DEC. 18, 1903.
PATENTED AUG. 11, 1908.
6 SHEETS—SHEET 3.
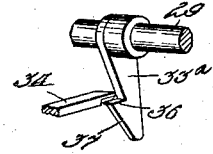
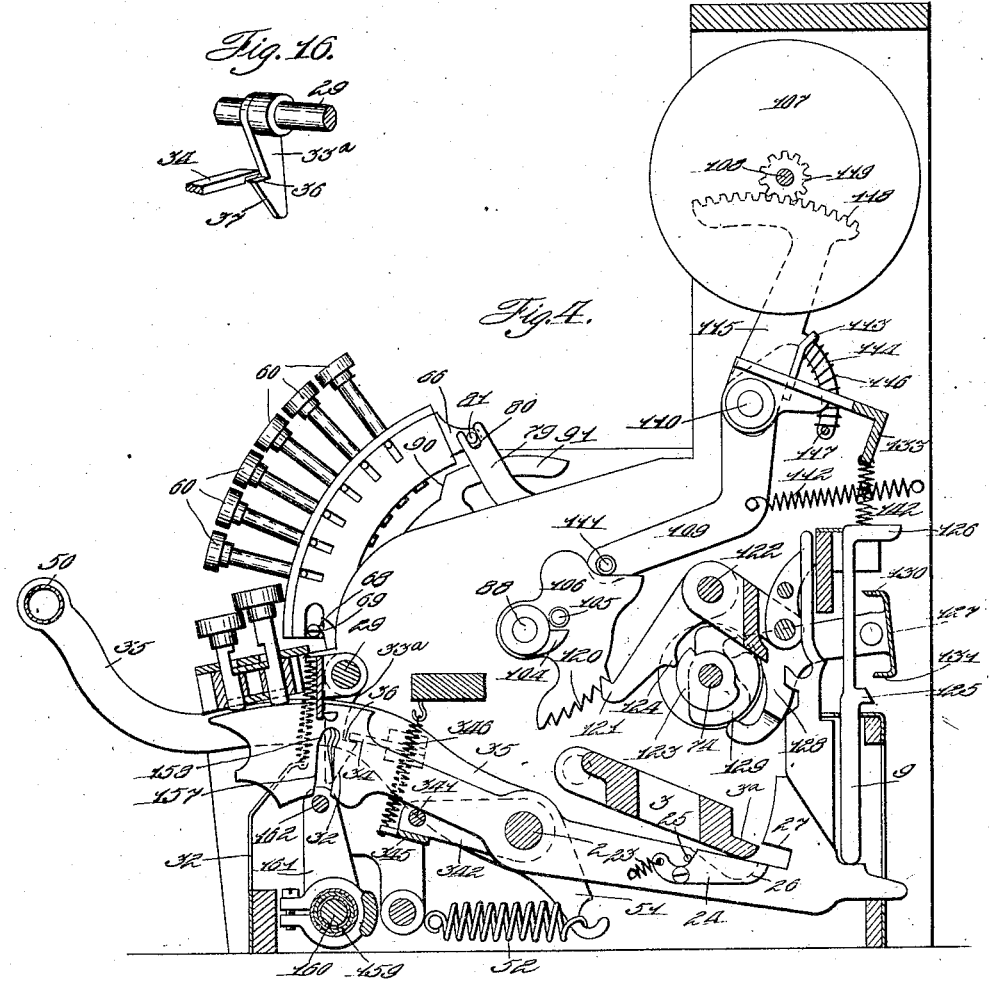

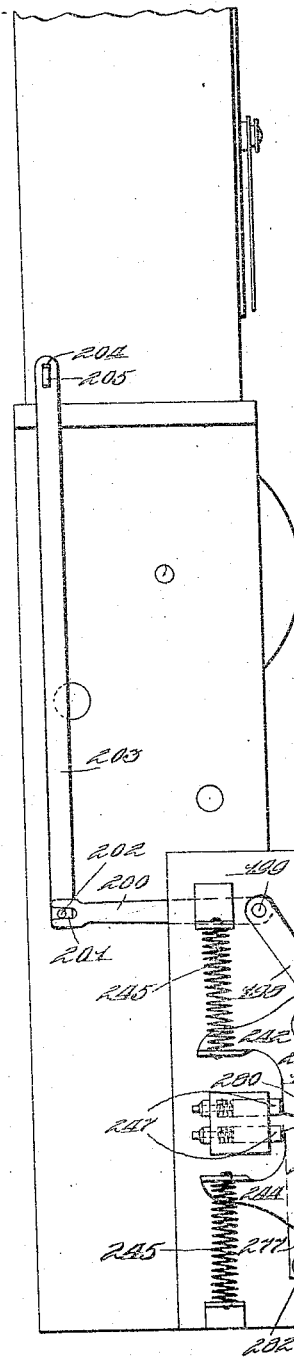

No. 895,960. PATENTED AUG. 11, 1908.
T. CARNEY.
CASH REGISTER.
APPLICATION FILED DEC. 18, 1903.
6 SHEETS—SHEET 5.
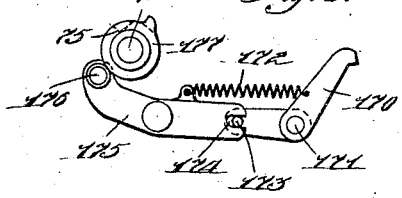
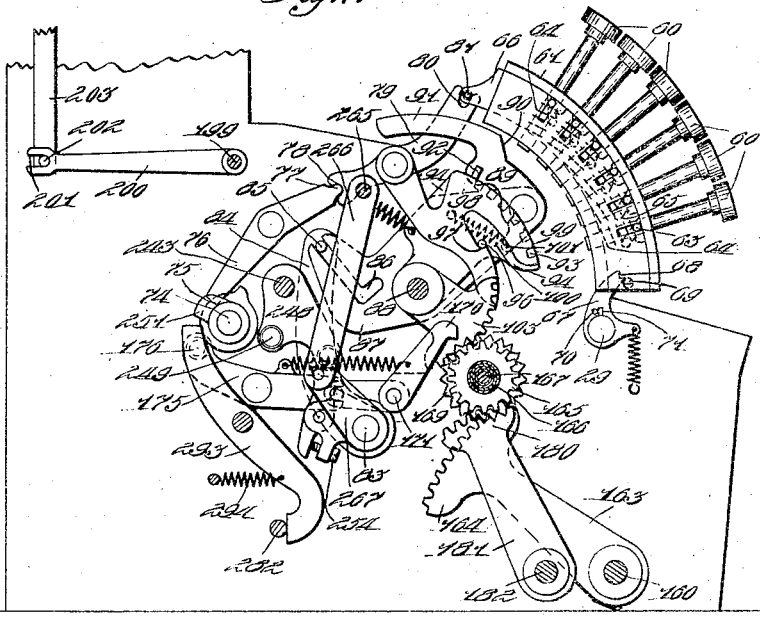
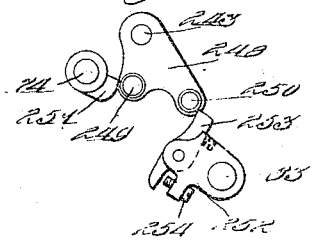
Witnesses
Inventor
Thomas Carney
Attorneys No. 895,960. PATENTED AUG. 11, 1908.
T. CARNEY.
CASH REGISTER.
APPLICATION FILED DEC. 18, 1903.
6 SHEETS—SHEET 6.
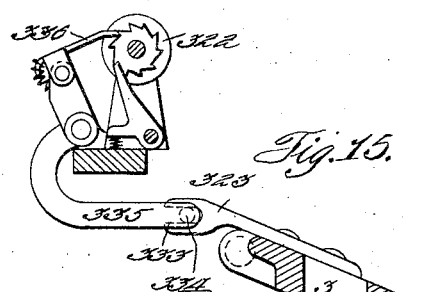
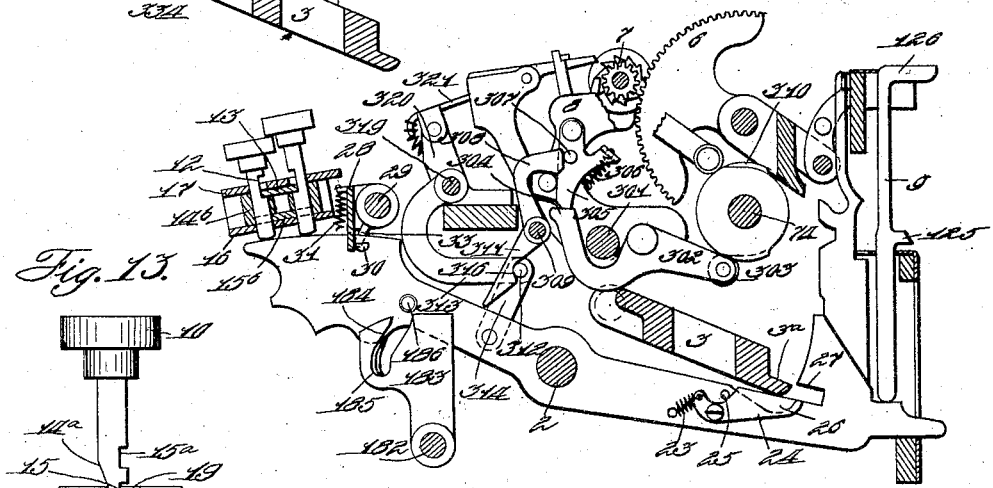
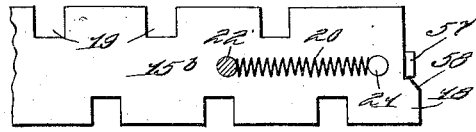
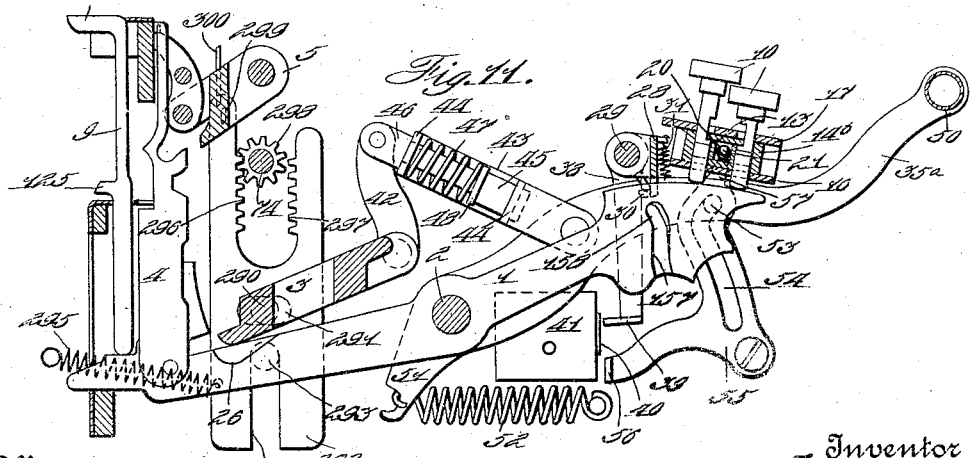
Witnesses
W. McCarthy
John J. Ungváry
Inventor
Thomas Carney
Attorneys

UNITED STATES PATENT OFFICE.

THOMAS CARNEY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 895,960.  Specification of Letters Patent.  Patented Aug. 11, 1908.

Application filed December 18, 1903. Serial No. 185,697.

*To all whom it may concern:*

Be it known that I, THOMAS CARNEY, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and has more particular relation to improvements in registers of the so-called two-motion type in which certain keys or setting elements are first operated and a handle or operating lever subsequently moved to complete the operation of the machine.

One of the several objects of the machine is to provide a machine of the class patented to me June 23, 1896, No. 562,707 with an improved rotary type of indicator.

A further object of the invention is to provide the class of machine mentioned with an operating yoke or lever located in proximity to all of the setting keys or elements.

The invention consists of certain novel constructions, combinations and arrangements of parts, all of which will be hereinafter more particularly set forth and claimed.

In the accompanying drawings forming part of this specification: Figure 1 represents a top plan view of a machine embodying my invention; the cabinet of the same being removed to expose the interior mechanism. Fig. 2 represents a transverse vertical section through the same on the line 2—2 of Fig. 1, the cash drawer being omitted. Fig. 3 represents a detail perspective view of one of the indicator setting frames. Fig. 4 represents a transverse vertical section on the line 4—4 of Fig. 1, the cash drawer being omitted. Fig. 5 represents a detail front elevation of the two sets of inter-geared indicators and the special indicator. Fig. 6 represents a side elevation of the machine showing the printing mechanism; the cabinet and cash drawer being omitted and the top of the clock casing being partly broken away. Fig. 7 represents a transverse vertical section on the line 7—7 of Fig. 1, a part of the casing being omitted for clearness. Fig. 8 represents a detail side elevation of the type-carrier alining pawls and coöperating parts. Fig. 9 represents a detail side elevation of the platen operating devices. Fig. 10 represents a detail transverse section on the line 10—10 of Fig. 1, a number of the parts being omitted. Fig. 11 represents a similar section on the line 11—11 of Fig. 1, looking in the opposite direction. Fig. 12 represents a detail top plan view of one of the key detent plates. Fig. 13 represents an enlarged detail side elevation of one of the keys. Fig. 14 represents a detail side elevation of the rock shaft with its graduated arms and connections for operating the special transaction indicator. Fig. 15 represents a detail section of the customer counter and its operating mechanism; and Fig. 16 represents a detail perspective view of the key releasing device.

As before stated, my present improvements are applied to the type of machine covered in my patent above named, and I will therefore refer to this patent for any detail description of the parts not found in the present specification. Described in general terms, however, the machine may be said to comprise a series of pivoted key levers 1 mounted upon a transverse shaft 2 and arranged to become coupled at their rear ends to a key coupler 3 so that when said coupler is actuated by an independently movable means, the key levers will move with said coupler and thus actuate the parts connected to said levers. Each of the key levers is provided with an operating standard 4, these standards having hooked projections which engage and actuate rocking frames 5 carrying counter operating segments 6. These segments 6 are arranged to engage and operate the counter pinions 7 when the counter is rocked rearward by the movement of the counter supporting frame 8. As shown in the aforesaid patent, the rear ends of the key levers support indicator standards so that when said levers are operated by the movement of the key coupler, the indicators, which are of tablet formation, will be raised into exposed positions and so latched. In the present machine, however, I have replaced these indicator standards or stems by a number of vertically movable standards similar thereto but having no tablet plates at their upper ends. These indicator standards 9 control the movements of the rotary indicators, as will be hereinafter more particularly described.

*The key and key levers.*—Reverting now to the key levers 1, I will describe how these levers are constructed so that they may be given an initial movement to bring them into coupling relation with the key coupler 3. Located across the front of the machine are a number of keys 10 arranged in two transverse rows, as clearly shown in Figs. 1 and 2. These keys in the present illustration are shown as arranged in banks representing respectively units and tens-of-cents and units and tens-of-dollars. Each of the keys comprises a suitably marked head and a pendent shank 11, each of the latter being formed with a notch 12 whereby it is limited in its movements. A plate 13 passes through all of the notches 12 and thus controls the movements of the keys in both directions. Each of the key shanks is also formed with notches 14, 15, and $15^a$ located upon opposite sides of the same. Each of the notches 14 is formed with an inclined or beveled wall $14^a$ for operating a locking plate hereinafter described. The key board frame proper comprises a channeled bar $14^b$ in which the plate 13 is mounted and which also forms a support for a sliding locking plate $15^b$. This frame is provided with bottom and top plates 16 and 17 respectively for securing the parts in position. The plate $15^b$ is more particularly shown in Fig. 12, and is formed at one end with a locking projection 18 and along its opposite edges with notches 19 through which the key shanks extend. The plate $15^b$ is normally drawn to the right into a position to cause its locking projection 18 to intercept the main operating lever, as hereinafter described, by means of a coil spring 20 which is interposed between a pendent stud 21 on this locking plate or slide and a projection 22 of the plate 13. The action of the spring 20 normally causes all of the walls of the notches 19 to engage the bevel walls $14^a$ of the key shanks. When a key is depressed the plate $15^b$ is thus forced to the left against the tension of its spring. The movement given to the plate $15^b$ by the depression of any key simply moves the projection 18 out of the path of a lever, hereinafter described, coupled to the main operating lever. After the movement of this lever is commenced, the plate $15^b$ is moved further to the left, as hereinafter described, and thus locks all of the keys against any operation after the regular movement of the machine has been commenced and until this movement is completed. When one of the keys is depressed in the manner above described the lower end of its shank which is normally resting upon the upper forward edge of one of the key levers 1, rocks said key lever upon its pivot against the tension of a spring 23, (see Fig. 10). This spring connects the key lever to a pivoted pawl 24 mounted on said lever and normally engaging the flange $3^a$ of the key coupler to force the key lever downward into its normal position. The pawl 24 is limited in its movement by a stop pin 25 mounted on the key lever. The upper edge of this pawl is parallel with the upper edge of the key lever and the pawl as a whole projects over a recess 26 formed in the key lever.

When any one of the keys 10 is depressed it depresses the forward end of its respective key lever 1 and thereby elevates the rear end of this lever. As the rear end of the lever moves upward the pawl 24 is rocked downward against the tension of its spring 23, and the upper hooked end 27 of the key lever is moved to a position above the coupling flange $3^a$ of the key coupler. When the key coupler is now operated its flange $3^a$ will engage under the hook projections 27 of all of the operated key levers and thus simultaneously actuate all of said levers. When the key coupler is finally returned to its normal position the key levers are given an additional downward movement by the pawls 24, which thereby return said key levers to their normal positions. Whenever any one of the key levers 1 is given its initial movement by the depression of its respective key, it is held in its depressed position by one of a series of rock detent plates 28, (see Figs. 2, 4, 10 and 11). These plates are loosely journaled upon a transverse shaft 29 and are formed upon their lower edges with a series of notches through which the respective key levers pass. Each of the key levers is provided with a locking projection 30, and the detents 28 are normally held against these projections by coil springs 31 which connect said detents to a slotted guiding plate 32, mounted on the main frame. There is one of the detents 28 for each of the banks of keys as well as a special detent for each of the special keys hereinafter described.

When a key lever is depressed in a manner before described, its projection 30 will force its detent 28 slightly forward until the projection has passed free of the detent, when the latter will resume its normal position over the key projection and lock the key lever in its depressed position. While all of the key detents 28 are independently movable upon the shaft 29, they are arranged to be simultaneously actuated by the shaft to release all of the key levers. For this purpose the shaft is provided with a plurality of radial arms 33, one for each of the detents, and so positioned that when the shaft 29 is rocked all of the detents will also be rocked. The rocking of the shaft 29 is automatically accomplished upon each operation of the machine to permit all of the key levers to return to their normal positions. To secure this result, one end of the shaft is provided with a pendent arm $33^a$, best shown in Fig. 4, and arranged to be engaged and operated by a pivoted pawl 34 mounted upon a lever 35 and normally spring-pressed into position over a shoulder 36, formed on the arm $33^a$. When the lever 35 is depressed the shoulder 36, (see Fig. 16) forces the beveled end of the pawl 34 laterally so that it travels down beside the arm 33ª until it passes below said arm when it resumes its normal position under the lower beveled edge 37 of said arm. As the lever 35 now passes upward the pawl 34 engages the beveled edge 37 and thus cams the arm 33ª forward and rocks the shaft 29 to release the key levers. It is also desirable at times to rock the shaft 29 and release the key levers without a regular operation of the machine and to accomplish this result I provide one end of the shaft 29 with a pendent arm 38 formed with an operating lug 39 at its lower end, (see Fig. 11). This lug projects into the path of a bolt 40 of a lock 41, which is operated by any suitable detachable key. If a clerk makes a mistake in pressing the improper keys he cannot himself correct this error but must first go to the proprietor and have him operate the lock 41 to release the depressed key levers, so that he can commence the operation anew.

As before stated, the key levers are first moved into coupling position in relation to the key coupler 3 and the latter then operated to complete the movements of the key levers. This operation of the key coupler is accomplished by an arm 42 fast to one end thereof, as shown in Fig. 11. This arm 42 is connected to a lever 35ª, similar to the lever 35, but located at the opposite end of the machine. The connection is established by a link 43 provided with two spaced apertured lugs 44. The lower lug 44 forms a guide for sliding a sleeve 45 fast to a bar 46 pivoted to the outer end of the arm 42. Said bar 46 passes through the upper lug 44 thereby forming a guide for the same. A coil spring 47 is interposed between the upper lug 44 and a flange 48 formed on the sleeve 45.

By the above described connections the movements of the lever 35ª will be communicated to the key coupler, but should the lever 35ª be violently operated the key coupler 3 will not immediately follow these violent operations as the spring 47, which is interposed between the parts, will absorb the shock. In order that the levers 35 and 35ª may be more conveniently operated the same are connected across the front of the machine by a hand bar 50 which extends directly in front of the banks of keys. The levers 35 and 35ª are pivoted upon the key shaft 2 and each of the same is provided with a pendent arm 51, which is connected by a coil spring 52 to the main frame. By this means, after the bar 50 has been depressed it is automatically returned to its normal position when released. The lever 35ª is also provided with a laterally projecting stud 53 which extends into a cam slot 54 formed in a bell crank lever 55. The lower arm of the lever 55 is provided with a lug 56 which cooperates with the bolt 40 of the lock 41 to prevent any movement of the bell crank when the bolt has been shot forward. By thus locking the bell crank the entire machine is locked as the bar 50 cannot be depressed without an accompanying movement of the bell crank 55. The upper end of the bell crank 55 is provided with a locking nose 57 which normally engages the flat side of the projection 18 of the key detent and thus prevents any operation of the bar 50. When the detent 15ᵇ is given its initial movement by the depression of a key, as before described, the beveled edge 58 of the projection 18 is brought into alinement with the nose 57. The lever 35 is thus free to descend with the bar 50. When the lever 35 is so operated the upper end of the bell crank 55 is cammed forward, the nose 57 engaging the bevel 58, and forcing the detent plate 15ᵇ further to the left, which causes the walls of the notches 19 to enter the notches 15 of the unoperated keys, and the notches 15ª of the operated keys to lock all of the keys during the time that the bell crank lever is so displaced from its normal position. The formation of the cam slot 54 is such that the bell crank 55 is immediately moved out of its normal position when the bar 50 is operated, and is not again returned to its normal position until the bar 50 again resumes its upper normal position. The effect of this construction is to positively lock all of the keys against movement during the time the machine is being operated.

In the above description I have set forth the construction and operation of the several banks of amount keys and their connections. At the left-hand side of the machine, however, is located what might be termed an independent bank of keys 60 representing the different departments or clerks, as desired. These keys are mounted radially in guide plates 61 and 62 secured to the main frame and are provided with pins 63 which contact with coil springs 64 mounted about the shanks of the keys and between the pins 63 and the plate 62. These pins effect the return of the keys to their normal positions when they are otherwise unrestrained. Each of the pins 63 also projects into one of a series of diagonal slots 65 formed in a sliding segmental plate 66, mounted between the plates 61 and 62.

It results from the above construction that when any one of the keys 60 is depressed the plate 66 is forced upward and rearward and remain so as long as the key remains in its lower position. When the plate 66 is forced upward in this manner it is latched in its upper position by a spring actuated pawl 67 loosely mounted upon the shaft 29, as shown in Fig. 7, and formed at its end with a locking notch 68 which, when the plate 66 is elevated, receives a pin 69 mounted on said plate and thus latches the latter in its elevated position. The latching pawl 67 is provided with a laterally projecting pin 70 which is arranged to be engaged by a pin 71 mounted on the rock shaft 29, upon which the pawl 67 is journaled.

It will be seen from the above that when the shaft 29 is rocked in the manner before described, the pawl 67 will be moved rearward and its notch 68 disengaged from the pin 69, which action will permit the plate 66 to resume its normal position. The aforesaid movement of the plate 66 is also utilized to release the machine. To accomplish this result the rotation shaft 74 is provided with a notched disk 75 into which the rear end of a bell crank lever 76 normally projects, as shown in Fig. 7. The forward end of the lever 76 is formed with a nose 77 which projects into a recess or socket 78 formed in a second lever 79, also pivoted upon the main frame. This lever 79 is formed at its upper end with a notch 80 into which projects a pin 81 mounted on the slide 66. When the slide is in the position shown in Fig. 7 the rotation shaft 74 of the machine is locked, but when the slide is elevated upon the depression of one of the department keys the levers 79 and 76 are rocked and the lower end of the latter moved out of the notch formed in the disk 75. When the plate 66 is released, as above described, it is forced downward by the spring 64 of the depressed key and the lever 76 thus caused to again resume its locking position.

By reference to Figs. 1 and 7 it will be seen that there are six of the keys 60, representing six different clerks or departments. As the operation of the different keys in this bank must result in or control the movements of certain parts to graduated degrees, I provide the extended trunnion 83 of the key coupler with an upwardly projecting lever 84, best shown in Fig. 7. This lever is provided at its upper end with a pin 85 which projects into an angular cam slot 86 formed in the lever 87, which is journaled upon a short transverse shaft 88 mounted in the main frame. The lever 87 is provided near its forward end with a pivoted segmental arm 89 having an inclined edge 90 and a curved edge 91. When the arm 84 is actuated by the movement of the key coupler the lever 87 will be correspondingly moved by the pin 85 traveling down in the operative portion of the slot 86. When the lever 87 is so rocked the pivoted arm 89 is moved forward until its inclined edge 90 contacts with the lower end of the stem of the depressed key. The continued movement of the lever 87 causes the arm 89 to be cammed downward and backward until the lower end of the key stem rides over the curved surface 91. When the arm 89 is cammed downward, as above described, a lug 92 mounted thereon is forced into one of a series of recesses 93, formed in the periphery of a plate 94 which is fast on the shaft 88. The plate 94 is thus picked up sooner or later and thus given a greater or less movement by said lever. The plate 94 is provided with a locking pin 96 which is normally engaged by a hook projection 97 formed on a pivoted plate 98, which is mounted upon the main frame. This plate 98 is provided with a segmental portion 99 the edge of which extends parallel with the notched edge of the plate 94. The pivoted latch plate 98 is held in its latching position by a coil spring 100 which connects it to a lug 101 formed on the arm 89. When the arm 89 is cammed downward and rearward, as before described, its lug projection 92 engages the edge of the segmental portion 99 of the pivoted latch plate 98 and thus causes the latch plate to disengage from the pin 96 and free the plate 94 so that the latter may be carried along with the arm 89. The shaft 88 is provided with a segmental rack 103 for operating the printer, as hereinafter described. The shaft 88 is provided within the main frame with an operating projection 104, best shown in Fig. 4, and arranged to engage an anti-friction roller 105 mounted upon the plate 106, which is journaled upon the shaft 88.

It will be seen from the above that the plate 106 will be moved to different positions according to the value of the key operated. This movement of the plate 106 is utilized to operate the special indicator, as hereinafter more fully described.

In the above description I have set forth in detail the construction and operation of the different banks of keys and their coöperating devices and I will now describe the connection and operation in conjunction therewith of the several indicators.

*The indicators.*—As before stated, the plate 106 of the special key bank is moved to different positions according to the operated value of the key 60 depressed. To utilize this movement to set the special rotary indicator 107, which is mounted loosely upon the transverse shaft 108, I provide a bell crank lever 109. This lever is pivoted upon a shaft 110 and is provided at its lower end with an anti-friction roller 111, which is normally drawn into contact with the upper edge of the plate 106 by a coil spring 112 which connects said lever to the main frame. The lever 109 is provided with a laterally projecting plate 113 which is apertured to permit the passage therethrough of the segmental arm 114 formed on a lever 115, which is pivoted upon the shaft 110. The arm 114 is surrounded by a coil spring 116; one end of said spring engaging the plate 113 and the other a pin 117 mounted in said arm. The upper end of the arm 115 is formed with a segmental rack 118 which meshes with a pinion 119, fast to the indicator 107.

It results from the above construction that when the lever 109 is actuated the spring 116 is compressed and the lever 115 thus operated. While the lever 109 may be operated with great rapidity no excessive momentum can be imparted to the indicator 107 as the spring 116 will simply yield on any excessive speed and will cause the indicator to take its position, which is determined by the final position of the arm 109, at a speed which will not endanger the accuracy of the indication. The plate 106 is provided with a plurality of ratchet teeth 120. These teeth are normally engaged by a pawl 121 mounted upon a shaft 122 and arranged to be forced into engagement with the teeth by a cam 123 mounted upon the rotation shaft 74 and engaging a nose 124 formed on the pawl. The formation of the cam 123 is such that the pawl 121 will be disengaged from the teeth 120 during the time the plate 106 is being set or while the indicator is returning to zero and will finally be reëngaged therewith after the indicator has taken up a new position. The indicator 107, as best shown in Fig. 5, is provided with two reversely arranged sets of indicating characters so located as to be displayed at the opposite sides of the machine.

The above description pertains exclusively to the indicator of the special clerks' bank and I will now describe the indicators for the regular amount banks.

As before stated, each of the key levers of the amount banks is arranged, when operated, to elevate a standard or rod 9. Each of these rods is provided with a latching projection 125 and a lifting projection 126. A rocking plate or yoke 127 is pivotally mounted at the rear of the machine and is provided with a forwardly projecting bifurcated arm 128. The bifurcated portion of this arm is engaged by a cam 129 mounted upon the rotation shaft 74 whereby the arm is rocked at the proper periods to permit any of the projections 125 to pass upward above the upper flange 130 of the back plate or rod. This flange 130 is then rocked in under the elevated projection 125 and the rod is thus locked in its elevated position. The lower flange 131 of the back rod locks all of the standards or rods 9 in their lower positions during the time the back rod is being shifted.

As before stated, each of the rods 9 is provided at its upper end with a lifting projection 126. When one of the rods 9 is elevated its projection 126 will engage one of a series of steps 132 formed upon a rocking frame 133, which is journaled upon the shaft 110, as best shown in Fig. 2. As the different steps 132 are located at different distances above the lifting projections 126 of their respective keys, it will be seen that the operation of the different rods 9 will operate the frames 133 correspondingly. Each of these frames 133 is provided with a laterally projecting lug 134 through which projects an arm 135 formed on a lever 136 which is journaled upon the shaft 110, and is provided at its upper end with a segmental rack 137 meshing with a pinion 138 of its respective rotary indicator 139. A coil spring 140 surrounds the arm 135 and bears with its opposite ends against said arm and the lug 134. A pin 141 mounted in the arm 135 below the lug 134 prevents said arm from passing out of the aperture in the lug and thus holds the parts in their normal set positions. Should one of the rods 9 be raised over rapidly and thus engage the frame 133 with considerable force, the spring 140 will yield and thus prevent any shock to the indicator. The subsequent expansion of the spring, however, will cause the indicator to take up the proper set position even after the movements of the frame 133 have ceased. Such a violent impact of the lifting projection 126 with the frame 133 would also cause the frame to be thrown upward a distance in excess of the movement imparted to it by the lifting standard or rod. The frame, however, is eventually returned to a position in which it engages the lifting projection of its rod 9 by a coil spring 142 which connects said frame 133 to the main frame. The levers 136 rest against a transverse rod 143 when in their normal positions.

It will be seen from the above that after one of the rods 9 is elevated it is latched in its elevated position by the flange 130 of the back rod 127. When latched in this position its projection 126 will support its respective frame 133 in a position equivalent to the value of the operated key, and the indicator 139 will thus display the proper amount at the indicator openings in the cabinet of the machine. As the present machine, however, is designed to indicate at both the back and the front of the machine, it becomes necessary to provide two sets of amount indicating indicators. These two sets are properly geared together by large gear wheels 144 secured thereto and connected by rotary sleeves 145 and a shaft 146 mounted in the main frame and carrying pinions 147, which mesh with said gear wheels in a manner well known in the art.

The above is true of all of the amount indicators excepting that representing tens-of-dollars. This indicator is made of double width and is provided with two reversely arranged sets of indicator numerals for indicating to the back and front of the machine.

By reference to Fig. 1, it will be seen that a number of special keys 179, representing "Charge," "Paid out," "Received on account" and "No sale" are located at different points along the regular amount keyboard. The operations of these keys and key levers are substantially the same as the amount keys and key levers, excepting, as before stated, that each of these special key levers is provided with an individual detent whereby it may be operated independently of the keys of any amount bank. These special key levers have no elevating standards 4 as they are not connected with the counter actuating devices but each of the same is provided with one of the operating standards 9. The lifting projections 126 of these standards are arranged to contact with and elevate a series of progressively arranged arms 149 rigid with the rock shaft 110. The arm 149 mounted on the right-hand end of said shaft is provided with an apertured lug 151 through which passes a curved arm 152 similar to the arm 135. The arm 152 is fast upon a lever 153 having a rack segment 154 which meshes with a pinion 155 on a special indicator 156. This special indicator is provided with two sets of characters or words for indicating to the back and front of the machine.

Having now described the indicating mechanism, I will pass on to a description of the printing devices, which devices are claimed in my co-pending application of even date herewith.

*Printing devices.*—Each of the amount key levers is formed with a slot having a cam portion 157 and a concentric portion 158. Mounted transversely of the machine are a series of nested sleeves 159 supported by a shaft 160. Each of the sleeves 159 as well as the shaft 160 is provided with two upwardly projecting arms 161. Each pair of these arms is connected to a transverse bar 162 which projects under the lower ends of the cam slots 157 of the key levers of the bank to which the particular bar 162 pertains. When the key lever is depressed at its forward end the walls of its particular cam slot will engage its respective bar 162 and thereby rock the arms 161 and the shaft or sleeve connected thereto to a greater or less extent. After the arms 161 are rocked to their full extent the continued movement of the key levers will cause the bars 162 to pass into the concentric slots 158, whereby the bars will be locked into the positions to which they have been set during the period of the free movement of said key levers.

By reference to Fig. 7 it will be seen that the outer end of the shaft 160 and also the outer ends of the sleeves 159 are provided with arms 163 formed with segmental racks 164. These racks mesh with pinions 165 mounted upon the inner ends of a series of nested sleeves 166 and a supporting shaft 167. These sleeves and shaft are provided at their outer ends with a series of type carriers 168, best shown in Fig. 1. Each of the sleeves and shaft is also provided with a star wheel 169 with which an alining pawl 170 coöperates to correct any misalinement of the printing type wheels. The pawl 170, as best shown in Fig. 8, is of bell crank formation and is pivoted upon the main frame at 171 and normally held retracted by a coil spring 172. The rear end of the pawl is provided with a pin 173 which projects into a notch 174 formed in a pivoted lever 175 to which the rear end of the spring 172 is connected. The rear end of the lever 175 is provided with an anti-friction roller 176 which engages a cam 177 mounted upon the rotation shaft 74. The formation of the cam 177 is such that the lever 175 is operated at the proper period to bring the pawls 170 into locking and alining engagement with the star wheels.

The above description covers the connections between the amount key levers and their printing type wheels. Located beside the main printing type wheels is a type wheel 178 for printing special characters representing the special keys 179. This type wheel is actuated through the medium of a segmental rack 180 mounted on an arm 181 which is fast to a transverse rock shaft 182, as best shown in Fig. 7. This shaft, as best shown in Fig. 10, is provided with a series of upwardly projecting plates 183 formed with slots having cam portions 184, and concentric portions 185. Anti-friction rollers 186 are mounted on the respective special key levers and operate in the cam slots substantially in the same manner as the bars of the amount key banks operate in the cam slots of the amount key levers. Located beside the special character printing wheel 178 is a clerks' character printing wheel 186. This wheel is mounted in a similar manner to the remaining wheels and its sleeve is provided with a pinion which meshes with a segmental rack 103, before described. All of the printing wheels are provided with double sets of types arranged upon diametrically opposite sides whereby duplicate impressions may be taken for both the detail strip and the check.

Loosely journaled upon the shaft 167 to the left of the amount printing wheels are three time printing wheels 187, 188, and 189. The wheel 189 is provided with duplicate sets of type numerals extending from 1 to 12. The wheel 188 is provided with duplicate type numbers representing the different multiples of 5 and extending from 5 to 55. The type wheel 187 is provided with two series of letter types which are alternately "A" and "P" as representing ante-meridian and post-meridian. The three wheels 187, 188, and 189 are actuated by a three-pronged pawl 190 which coöperates with ratchet wheels 191 secured to the said type wheels. The pawl 190 is of a variety having a plurality of different lengthed tines which coöperate with deep tooth ratchet notches in the wheels 191 to provide for transferring movements to move one wheel after the preceding wheel has moved a half revolution, which operation is old and well known in the art. The pawl 190, as best shown in Fig. 6, is pivoted in the upper end of the arm 192 fast to the sleeve 193 which is journaled upon a short shaft 194, secured to the main frame. The sleeve 193 also carries an arm 195, provided with a pin 196. This pin projects into an elongated slot 197 formed in the lower end of an arm 198 which is fast to a short shaft 199, journaled on the main frame, as clearly shown in Fig. 1. The shaft 199 carries a rearwardly extending arm 200 which is formed at its rear end with an elongated slot 201. This slot receives a pin 202 mounted on the lower end of a rod 203. The rod 203, as best shown in Fig. 6, is formed with a slot or aperture 204 at its upper end for the reception of the end of a lever 205, which is journaled upon the main frame. The lever 205 is connected by suitable devices with the clock mechanism so that it will be actuated every five minutes to move the printing wheels forward.

The devices for securing the impressions from the respective type wheels comprise two platens 240 and 241, (see Fig. 6). The platen 240 is mounted upon the platen lever 242 which is fast to a shaft 243 passing through the main frame. While the platen 240 is journaled upon a similar lever 244, the platen levers are actuated by coil springs 245 which connect them to the main frame. These platen levers are normally held out of contact with the type wheels by spring-pressed plungers 247 mounted upon the main frame and engaging their respective platens, as clearly shown in Fig. 6. The movement for operating the platens is primarily applied to the shaft 243 by means of devices illustrated in Figs. 7 and 9. These devices comprise a plate 248 fast to the inner end of said shaft and provided with two spaced anti-friction rollers 249 and 250. The rotation shaft 74 is provided with a locking and releasing cam 251 which coöperates with a roller 249 while the extended journaled end 83 of the key coupler has fast thereon a block 252 carrying a spring-pressed pawl 253 which is limited in its movements by an adjustable stop screw 254. When the key coupler is being elevated the pawl 253 engages the roller 250 and rocks the shaft 243 to elevate the platen against the tension of its spring. Just prior to the time when the pawl passes free of the roller 250 the cam 251 engages the roller 249. Upon the backward movement of the key coupler and the attendant rotation of the shaft 74 the cam 251 is advanced far enough to release the platen lever and permit the same to take an impression from the type wheels. The above construction also relieves the rotation shaft 74 of the duty of raising the platen lever against the tension of its spring and throws this strain upon the key coupler which more directly receives the applied power.

By the above described means the platen lever 242 is actuated upon each movement of the key coupler. As the movement of the platen lever 242 is constant this lever is utilized to accomplish the printing of the detail strip 255. This strip passes between the platen 240 and the type wheels and over two guiding bars 256 and 257. The strip is led from a supply roller 258 and is fed forward by a feeding roller 259. This latter roller is provided with a winding ratchet 260 fast thereto. The ratchet 260 is engaged by a retaining pawl 261 and an operating pawl 262, said pawls being connected by a coil spring 263. The pawl 262 is pivotally mounted upon a bell-crank lever 264. A pin 265 mounted on one end of this bell-crank projects through the frame of the machine and is connected by a link 266 to a crank arm 267 fast to the extended journaled end 83 of the key coupler. By this means the bell crank lever 264 is oscillated upon each operation of the machine and feeds the detail strip forward a suitable distance. The pin 265 also supports a pendent hooked bar 268, the lower end of which is normally held into engagement with a ratchet wheel 269 by a coil spring 270 which connects the upper end of the hooked bar to the bell crank lever. The ratchet 269 is secured to one end of an absorbent inking and feeding roller 270$^a$, journaled upon the main frame. The inking ribbon passes about this roller and also about suitable guiding studs 271 mounted upon the main frame. The ribbon also passes about an anti-friction roller 272 mounted upon a lever 273 which is journaled upon the main frame and is normally forced forward by a coil spring 274, which surrounds its journal and bears with one end against said lever and the other against the main frame. The ribbon is thus normally held taut and under tension. When it is desired to change the ribbon or re-ink the absorbent roller the lever 273 is moved forward and is retained in this forward position by a hooked pawl 275, which is hooked over the guide bar 256. A series of spring-pressed retaining pawls 276 are mounted upon the main frame and are arranged to engage the ratchet wheels 191 of the time printing types to prevent retrograde movement of the same. The lower platen lever 244 for securing an impression upon the check is arranged to be coupled to the upper lever 242 by a sliding plate 277 slotted to receive a journal pin 278 of the lower platen lever and a pin 279 secured to the upper portion of the platen lever. The upper slot of the plate 277 is arranged to receive a pin 280 mounted upon the upper platen lever, when the plate is raised in the manner to be now described.

The lower portion of the plate 277 is formed with a horizontal slot 281 into which projects a pin 282 mounted upon a pivoted lever 283. This lever 283 is provided with a pin 284 which projects into an elongated notch 285 formed in the rear arm of a bell crank lever 286. The upper arm of this bell crank lever is pivoted to a check holder or slide 287, which slide is normally retracted in the position shown in Fig. 6 by a coil spring 288 which connects it to the main frame. The rear end of the slide is formed with a slotted arm 289 which receives a guiding pin 290, fast to the main frame. The forward end of the slide is provided with a spring clip 291 for securing the check upon the slide. The rear portion of the check holder is suitably apertured to permit of the passage of the platen 241 therethrough, whereby the check is forced against the types. After the check has been inserted in the holder 287 the holder is forced rearward. This movement of the check holder rocks the levers 286 and 283 and elevates the slide 277 to couple the two platen levers together. When the slide 277 is so elevated the pin 282 passes above the lower end of a hooked lever 293 and thus permits said lever to be drawn forward under the pin by a coil spring 294 which connects the lever to the main frame. This lever, as best shown in Fig. 7, engages the cam 75 and is thereby operated at the proper time to permit all of the check holding devices to return to their normal positions and leave the lower platen lever inoperative. A rigid arm 287ª projects up through the aperture formed in the carrier 287 to support the check in proper position before the check printing platen is elevated to effect the impression.

It will be seen from the above that the operation of inserting the check and pushing the check holder rearward couples the lower platen to the upper platen so that the check will be printed and that the parts thereafter automatically return to their normal positions in which the check platen lever is inoperative. By this means the check printing devices remain inactive unless a check is desired.

By the connections above described, the depression of the respective key levers actuates the nested sleeves 159 and the shaft 160. When the key levers, however, return to their normal positions the bars 162 are entirely free of the walls of the cam slots 157. It therefore becomes necessary to provide some means for locking these sleeves and shaft in their normal positions. For this purpose one of the arms 161 of each bank of keys is provided with a locking hook 337 which engages a hook 338, formed on a lever 339 which is journaled on the shaft 2. All of the levers 339 are connected by a cross bar 341 which also connects them to a lever 342 mounted on the shaft 2. The levers 342 and 339 are also connected by a strengthening cross plate 345 which is normally drawn upward by a coil spring 346 which connects it to the main frame.

By the above means, when any one of the key levers is operated it depresses its respective rod 341 and its companion hook 338, and thus unlatches the printing shaft or sleeve appropriate to the bank in which said key is operated. When the key lever is allowed to assume its normal position the parts again become locked, as clearly shown in Fig. 2.

The rotation shaft 74, before mentioned, receives a complete rotation upon each operation of the machine through the medium of the key coupler 3. To accomplish this result the key coupler is provided at its right-hand end with a laterally projecting pin 290 which extends into a horizontal slot 291, formed in a vertically movable rack plate 292. This plate is guided at its lower end by a pin 293 mounted upon the main frame and projecting into an elongated slot 294 formed in said plate. A coil spring 295 connects the plate to the main frame in such manner that the tension of the spring is alternately exerted above and below the pin 293 which acts as a fulcrum upon which the plate 292 rocks. The upper portion of the plate 292 is formed with two vertical arms 296 and 297 formed upon their inner edges with rack teeth. The shaft 74 is provided with a pinion 298 which is arranged to be alternately engaged by the rack teeth on the arms 296 and 297 as the plate 292 is rocked upon its fulcrum. The plate 292 is held to vertical movement in its different adjusted positions by a lug 299 which coöperates with a stationary flange 300 of the main frame.

The above construction is old and well known in the art and no further description of the same is throught to be necessary.

The operation of the counter and the transfer devices of the same are substantially as shown and described in the aforesaid patent, with the exception of the throwing devices by which the counter frame 8 is moved forward to bring the counter pinions 7 into mesh with the rack segments 6. The frame 8 is suitably pivoted or fulcrumed on the main frame as at 301. This frame carries a lever 302 which is provided at its rear end with an anti-friction roller 303 and is formed at its forward end with an upwardly projecting arm 304. This arm projects below the lower end of a pivoted pawl 305 which is mounted upon the counter frame and is normally drawn forward by a coil spring 306 which connects it to the counter frame. The pawl 305 is provided with a pin 307 which normally contacts with the upper end of an arm 308 mounted upon a transverse rock shaft 309, all of which is best shown in Fig. 10. The roller 303 engages a cam 310 fast to the rotation shaft 74. When the parts are in the position shown in Fig. 10, the rotation of the shaft 74 will effect the rocking of the lever 302. As the upper end of the lever engages the lower end of the pawl 305 the frame 8 will be rocked forward and the counter pinions brought into mesh with the rack segments 6. When any one of the special transaction keys is operated, however, it is necessary to prevent the addition of any amount upon the counter, and to accomplish this result I provide the shaft 309 with a series of pendent cam arms 311. These arms 311 engage laterally projecting pins 312 secured to pivoted levers 313 which are journaled upon the main frame and are connected to the respective special keys by link bars 314. Each of the arms 311 is formed with a notch 316 in which its respective pin 312 normally rests. When any one of the special key levers is given its initial movement its link 314 is drawn downward and the pin 312 caused to pass out of the notch 316 and thus cam its respective arm 311 forward. Such a movement of any one of the arms 311 will rock the shaft 309 and cause the arm 308 to engage the pin 307 and force the pawl 305 forward from over the arm 304 of the lever 302. The operation of this lever will not now effect any movement of the frame 8 as the lever is free to move upon its fulcrum and is not locked to the frame as it is when the pawl 305 is in its normal position shown in Fig. 10.

When the parts return to their normal positions after the operation of the machine the lever 302 automatically becomes locked to the counter frame again by the pawl 305 passing forward over the upper end of the lever 302. The movements of the levers 313 are utilized to actuate special counters 317, best shown in Fig. 1. To accomplish this result the levers 313 are fast on short shafts 319 mounted on the main frame. These shafts carry arms 320 upon which are mounted three pronged pawls 321 for actuating the special counters in a manner well known in the art. A special counter 322 is also mounted upon the main frame and is actuated in substantially the same manner as the counters 317, except that a rigid arm 323 for communicating movements thereto projects from the key coupler so as to be actuated upon each operation of the machine. The lever is formed at its forward end with an elongated slot 333 into which projects a pin 334 formed on a pivoted lever 335 which carries an actuating pawl 336 for the counter 322. As this counter 322 is actuated upon each operation of the machine it forms a customer counter and records the number of transactions during the day.

While I have shown in the drawings certain constructions for securing the desired results I do not care to limit myself to such constructions as many other similar mechanisms may be employed for the purposes set forth without departing from the spirit of this invention. Certain of the constructions shown and described herein are also described in my co-pending divisional application Serial No. 185696.

Having thus described my invention, what I claim as new and desire to secure by Letters Patent is:

1. In a cash register, the combination with a series of operating elements, of a series of indicators, indicator operating devices, a movable member arranged to be differentially actuated by the operating elements, a spring interposed between the indicator operating devices and the movable member whereby the movements of the latter are yieldingly transmitted to the former, and means for directly supporting the differentially movable member in any of its differentially adjusted positions between operations.

2. In a cash register, the combination with an operating mechanism, of a step frame arranged to be moved different distances thereby, an indicator having a number of indicating characters thereon, operating devices for the indicator, a spring interposed between the step frame and the indicator operating devices, and means for directly supporting the differentially movable step frame in any of its differentially adjusted positions between operations.

3. In a cash register, the combination with a rotary indicator, of an indicator operating device, a differentially movable member having graduated projections, a spring interposed between the indicator operating device and the movable member, an operating mechanism for actuating said movable member, and means for directly supporting the differentially movable member in any of its differentially adjusted positions between operations.

4. In a cash register, the combination with a rotary indicator, of a rack for actuating the same, a differentially movable member having graduated projections, a spring interposed between the rack and said member, an operating mechanism for said member, and means for directly supporting the differentially movable member in any of its differentially adjusted positions between operations.

5. In a cash register, the combination with an indicator, of an operating device for the same, a differentially movable member, a spring intermediate said member and the operating device, a series of individually movable actuators for the movable member, and means for directly supporting the differentially movable member in any of its differentially adjusted positions between operations.

6. In a cash register, the combination with an indicator, of an operating device for the same, a differentially movable step frame, a spring intermediate the step frame and the indicator operating device, a series of individnally movable actuators for the step frame, and means for directly supporting the differentially movable step frame in any of its differentially adjusted positions between operations.

7. In a cash register, the combination with a rotary indicator, of a rack for operating the same, a differentially movable pivoted step frame, a spring intermediate the rack and the frame, a series of individually movable actuators for said frame, and means for directly supporting the differentially movable step frame in any of its differentially adjusted positions between operations.

8. In a cash register, the combination with a rotary indicator, of a pivoted rack for operating the same, a differentially movable pivoted step frame, yielding means connecting the rack and the frame, an operating mechanism for moving the frame, and means for directly supporting the differentially movable step frame in any of its differentially adjusted positions between operations.

9. In a cash register, the combination with a series of keys, of a series of key levers, means for operating the key levers, a series of independently movable rods coöperating with the key levers, a movable frame actuated differentially by said rods, an indicator, indicator operating devices, and a spring connecting the movable frame and said devices, with provisions for limiting the relative extent of movement between the frame and the operating device.

10. In a cash register, the combination with a series of setting keys, of a differentially movable frame, independently movable actuators for the frame, means for controlling the actuators from the keys, an indicator, an indicator operating device, and a spring intermediate said frame and said operating device, with provisions for limiting the relative extent of movement between the frame and the operating device.

11. In a cash register, the combination with a rotary indicator, of an indicator operating device, a movable member having graduated projections, a spring between the indicator operating device and the movable member, and operating mechanism for actuating said movable member, and means for directly supporting the operating mechanism in set position between operations of the machine.

12. In a cash register, the combination with a series of keys, of a series of key levers, a pivoted key coupler to which the key levers may become coupled, an operating yoke lever, and spring devices connecting the yoke lever to the key coupler.

13. In a cash register, the combination with a series of keys, of a key detent arranged to be moved by said keys, and an operating mechanism normally locked by the detent; the construction being such that the operating mechanism, when actuated, will give the detent an additional movement to lock all of the keys.

14. In a cash register, the combination with a series of keys, of a key detent arranged to be actuated by said keys, an operating mechanism, and a lever connected to said mechanism and normally locked by the detent; the construction being such that said lever, when operated, moves the detent to lock the keys.

15. In a cash register, the combination with a series of keys, of a series of key levers, a key coupler, an operating lever, a pivoted plate connected to the operating lever, a pivoted rod connected to the key coupler, and a spring interposed between said plate and rod.

16. In a cash register, the combination with a series of keys, of a series of key levers, a key coupler, an operating lever yoke extending across in front of the keys, a pivoted plate connected to the lever yoke, an arm connected to the key coupler, a pivoted rod connected to said arm, and a coil spring interposed between the rod and the pivoted plate.

17. In a cash register, the combination with a series of keys, of a key detent, an operating mechanism, and a lever connected to the operating mechanism and normally locked by the detent; the construction being such that the lever, when operated, actuates the detent and locks the un-operated keys in their normal positions and the operated keys in their depressed positions.

18. In a cash register, the combination with a series of key levers having locking projections, of a detent plate located over said levers and coöperating with the projections, a lever connected to said detent, and a lock having a bolt arranged to operate said lever.

19. In a cash register, the combination with a series of keys, of a series of key levers arranged in banks and each of the same provided with a locking projection, a series of pivoted detent plates arranged above the key levers and coöperating with said projections, a rock shaft for simultaneously operating all of the detent plates, a lever connected to said rock shaft, and a lock having a bolt arranged to actuate said lever.

20. In a cash register, the combination with a series of keys, of an operating mechanism, a detent for said keys, and means intermediate the detent and the operating mechanism whereby the initial movement of a key actuates the detent to unlock the operating mechanism, and the movement of the latter further actuates the detent to lock the keys.

21. In a cash register, the combination with an operating mechanism, of a series of keys, a key detent, a rock shaft for operating the same, a beveled arm mounted on said shaft, and a pivoted spring-pressed pawl connected to the operating mechanism and arranged to actuate the beveled arm when moving in one direction, but to pass on the other side of the same when moving in the opposite direction.

22. In a cash register, the combination with an operating mechanism, of a driving member connected thereto and having a regular excursion upon each operation of the machine, a driven member arranged to be coupled to the driving member, an accounting device connected to the driven member, a series of keys for predetermining the extent of movement of the driven member, and a coupling member carried by the driving member and formed with a cam portion and a plain portion arranged to be engaged by said keys whereby the operated key will engage said cam portion to effect the coupling and then said plain portion to maintain the coupled relation.

23. In a cash register, the combination with an operating mechanism, of a driving member, a driven member arranged to be coupled to the driving member, and a series of keys for predetermining the extent of movement of said driven member, said driving member being formed with a cam portion and a plain portion engaged by said keys whereby to first couple the driven member to the driving member and then maintain the coupled relation during the continued movement of the driving member.

24. In a cash register, the combination with an operating mechanism, of a driving member having a uniform excursion at each operation of the machine, a driven member formed with a segmental rack, an accounting device connected to the driven member, a pivoted coupling member carried by said driving member and formed with a cam portion followed by an elongated bearing portion, means carried by said coupling member for engaging the segmental rack of the driven member, and a series of keys for engaging both the cam portion and the elongated portion of said coupling member whereby to effect the coupling between the driving member and said segmental rack and maintain the coupling during the continued movement of the driving member.

25. In a cash register, the combination with a series of keys and an operating mechanism, of a detent for the keys, means for giving said detent an initial displacement on the depression of said keys, and means connected with the operating mechanism for giving said detent a final displacement to effect the locking of the keys.

26. In a cash register, the combination with a series of keys and an operating mechanism, of a detent for the keys, means connected with the keys for giving the detent an initial displacement upon the depression of a key, and means connected with the operating mechanism for positively giving the detent a further displacement to lock said keys.

27. In a cash register, the combination with an indicator bearing a plurality of indicia, a rack for operating said indicator, a graduated means for moving said rack, yielding transmission means intermediate said graduated means and said rack, a plurality of controlling devices for the graduated means, and a series of key levers having initial and final movements for operating the controlling devices during the final movements thereof.

28. In a cash register, the combination with an indicator having a plurality of indicia, of a graduated means controlling same, yielding connecting means between said indicator and said graduated means, and a series of manipulative devices having initial and final movements arranged to operate the graduated means during the final movement of the said devices.

29. In a cash register, the combination with a rotary indicator, of a graduated frame governing same, means between said frame and indicator for yieldingly holding them in predetermined relative position, a series of operating devices having initial and final movements for operating said frame during the final movement, and means for holding the operating devices in set position between operations of the machine.

30. In a cash register, the combination with a bank of key levers each having a cam slot therein, a type carrier and a sleeve supporting same, and a frame mounted rigidly on said sleeve and including a bar common to and adapted to be operated by the cam edge of any key slot.

31. In a cash register, the combination with a series of key levers, having graduated cam slots, a type wheel, a sleeve carrying same, a frame carried rigidly by said sleeve and including a projection adapted to be operated by the cam edges of the key slots, and means normally locking said frame from movement with provisions for releasing said lock by movement of any key lever in the series.

32. In a cash register, the combination with a series of keys, a sliding key detent plate, means on said keys for operating said detent, and an operating mechanism normally locked by the detent, said operating mechanism having provisions for further operating said detent to lock the keys.

33. In a cash register, the combination with an operating mechanism, and a series of keys, of a sliding detent plate for the operating mechanism and the keys, having provisions for normally locking the operating mechanism, means on the keys for moving said detent to unlock the operating mechanism, and means on the operating mechanism for giving the detent a further movement to lock the keys.

34. In a cash register, the combination with an operating mechanism and a bank of manipulative devices, of a sliding key detent normally engaging and locking said operating mechanism, said keys having provisions for sliding said detent to unlock the operating mechanism, and means operated by said operating mechanism for giving said detent a further sliding movement to lock the keys.

35. In a cash register, the combination with an operating mechanism and a bank of manipulative devices, of a sliding key detent normally engaging and locking said operating mechanism, said keys having provisions for sliding said detent to unlock the operating mechanism, and means operated by said operating mechanism for giving said detent a further sliding movement to lock the operated key in set position and the unoperated keys in normal position.

36. In a cash register, the combination with a series of manipulative devices, of a detent for locking same in adjusted position, a lever having engagement with said detent, and a key operated bolt to operate said lever to release the manipulative devices.

37. In a cash register, the combination with an operating lever and a series of manipulative devices, of detents for locking said devices in set position, a lever connected to said detents, a lever connected to the operating mechanism, and a key operated bolt for releasing the manipulative devices and for preventing movement of the operating mechanism.

38. In a cash register, the combination with an accounting device, of an oscillating member for moving same, a projection on said member, a locking device engaging said member, a driving device, a series of keys, and means on said driving device for releasing said locking device and connecting said oscillating member to said driving device at a point determined by the depressed key.

39. In a cash register, the combination with a plurality of indicators having a plurality of distinguished insignia thereon, a plurality of movable members and means yieldingly connecting them to the indicators, a plurality of keys controlling the set positions of the movable members and a locking device advanced and retracted at each operation of the machine for holding said members between operations of the machine.

40. In a cash register, the combination with a differentially movable member, of an indicating device yieldingly operated thereby, keys controlling the set position of the movable member, and means for holding the member in set position between operations of the machine.

In testimony whereof I affix my signature, in the presence of two witnesses.

THOMAS CARNEY.

Witnesses:
HERBERT C. WOOD,
WM. O. HENDERSON.